US008463414B2

(12) United States Patent
Francois et al.

(10) Patent No.: US 8,463,414 B2
(45) Date of Patent: Jun. 11, 2013

(54) METHOD AND APPARATUS FOR ESTIMATING A PARAMETER FOR LOW BIT RATE STEREO TRANSMISSION

(75) Inventors: Holly L. Francois, Guildford (GB); Jonathan A. Gibbs, Winchester (GB)

(73) Assignee: Motorola Mobility LLC, Libertyville, IL (US)

( * ) Notice: Subject to any disclaimer, the term of this patent is extended or adjusted under 35 U.S.C. 154(b) by 314 days.

(21) Appl. No.: 12/852,649

(22) Filed: Aug. 9, 2010

(65) Prior Publication Data

US 2012/0033817 A1 Feb. 9, 2012

(51) Int. Cl.
*G06F 17/00* (2006.01)

(52) U.S. Cl.
USPC .......... 700/94

(58) Field of Classification Search
USPC .......... 700/94; 381/1, 17–23, 307, 61, 77; 704/500–504
See application file for complete search history.

(56) References Cited

U.S. PATENT DOCUMENTS 7,382,886 B2 6/2008 Henn et al.
2003/0026441 A1* 2/2003 Faller .......... 381/98
2008/0002842 A1* 1/2008 Neusinger et al. .......... 381/119
2010/0125453 A1 5/2010 Gibbs et al.

FOREIGN PATENT DOCUMENTS

GB 2453117 A 4/2009
WO 2006000952 A1 1/2006
WO 2009042386 A1 4/2009

OTHER PUBLICATIONS

Purnhagen, Heiko: "Low Complexity Parametric Stereo Coding in MPEG-4", Proc. of the 7th Int. Conference on Digital Audio Effects (DAFx'04), Naples, Italy, Oct. 5-8, 2004, all pages.

Suresh, K. And Sreenivas, T.V.: "Parametric stereo coder with only MDCT domain Computations", Signal Processing and Information Technology (ISSPIT), 2009 IEEE International Symposium on, Dec. 14-17, 2009, pp. 61-64.

Samsudin et al.: "A Stereo to Mono Dowmixing Scheme for MPEG-4 Parametric Stereo Encoder", Acoustics, Speech and Signal Processing, 2006, ICASSP 2006 Proceedings, 2006 IEEE International Conference on, vol. 5, May 14-19, 2006, all pages.

Patent Cooperation Treaty, "PCT Search Report and Written Opinion of the International Searching Authority" for International Application No. PCT/US2011/043275 dated Sep. 23, 2011, 11 pages.

Faller, Christof, "Parametric Coding of Spatial Audio—Thesis No. 3062", These Presentee A La Faculte Informatique Et Communications, Institut De Systemes De Communication, Section Des Systemes Decommunication, Ecole Polytechnique Federale De Lausanne, Pour L'Obtention Du Grade De Docteur Es Sciences, Jan. 1, 2004, XP002343263, 90 pages.

* cited by examiner

*Primary Examiner* — Andrew C Flanders

(57) ABSTRACT

A method for estimating a parameter for low bit rate stereo transmission that includes deriving estimate of any time delay between left and right audio channels in a multi-channel signal from a time delay subsystem. A cross-correlation between the left and right audio channels in the time delay subsystem is employed. Thereafter a normalized cross-correlation within an inter-channel intensity difference (IID) processor is employed before deriving estimate of panning gains for the left and right audio channels from the IID processor.

11 Claims, 6 Drawing Sheets

METHOD AND APPARATUS FOR ESTIMATING A PARAMETER FOR LOW BIT RATE STEREO TRANSMISSION

FIELD OF THE DISCLOSURE

The present disclosure relates generally to stereo transmission and more particularly to low bit rate stereo transmission.

BACKGROUND

Previous methods for estimating panning gains in full stereo encoding have relied on calculating gains for each of a multiple of frequency bands. These conventional methods are designed to cope with complex stereo scenarios, as found in popular musical productions. Accordingly, these conventional methods are extremely complex and require a high transmission bit rate.

In addition, new codecs are currently being developed that have stereo capabilities. These codecs will likely be used where available bit rate will vary. For example, where radio link changes occur for short periods of time during poor channel conditions.

Therefore, a need exists for a method and an apparatus for estimating panning gain parameters for low bit rate stereo transmission that will be significantly less complex for real-world stereo recordings of speech in audio conferencing environments, for example.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
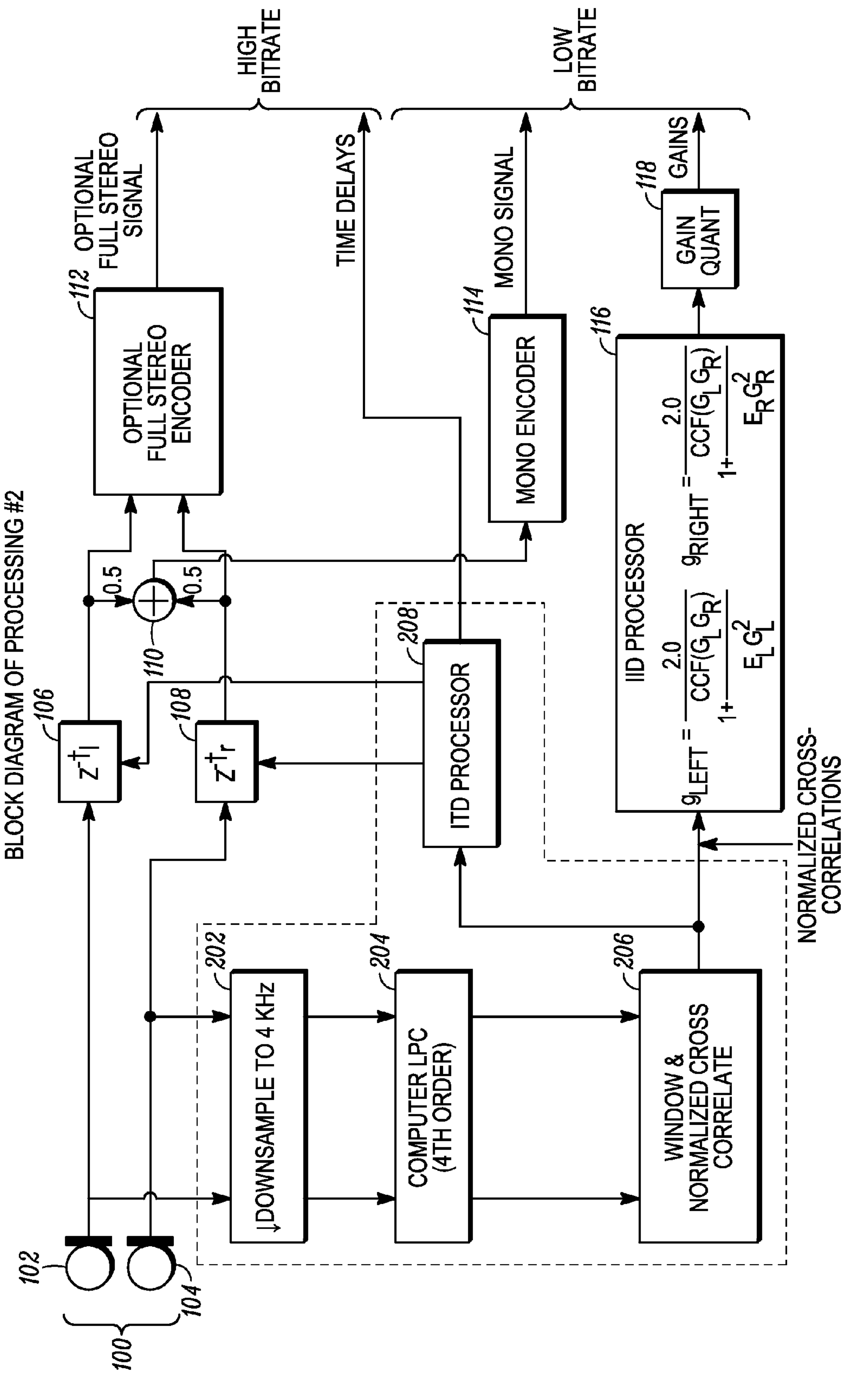
FIG. 1 is a block diagram of processing in accordance with some embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Described herein along with other embodiments is a method for estimating panning gain parameters for low bit rate stereo transmission. The method includes deriving an estimate of any time delay between the left and right audio channels in a multi-channel signal from a time delay subsystem, and then employing cross-correlation between the left and right audio channels in the time delay subsystem. An inter-channel intensity difference (IID) processor employs a normalized cross-correlation before the estimate of panning gains for the left and right audio channels are derived from the IID processor.

FIG. 1 is a block diagram of processing employed for at least one embodiment of the present invention. A set of microphones 100 indicate a multi-channel signal with at least left and right audio channels that may include microphone 102 and microphone 104, wherein either microphone can yield left and right audio signals. For illustrative purposes only, microphone 102 functions as the left audio channel and microphone 104 functions as the right audio channel.

Still referring to FIG. 1, independent delay blocks 106 and 108 operate on the left and right audio channels, respectively. Delay blocks 106 and 108 are impacted by the processing signal resulting from a time delay block 200. Within time delay block 200 the left and right audio channels are decimated (i.e., downsampled) to a lower sample rate and bandwidth in block 202. Thereafter, the lower bandwidth signal is used to compute linear predictive coefficients (LPC) in block 204 before being windowed and normalized for a cross-correlated signal in block 206. The windowed and normalized cross-correlated signal is sent to an inter-channel time difference processor (ITD) in block 208; whereupon the delay blocks 106 and 108 receive the ITD parameter before sending the left and right audio channels to summer 110 for a low bit rate mono signal.

For a high bit rate full stereo signal, summer 110 is bypassed and the left and right audio channel signals from delay blocks 106 and 108 are sent to a full stereo encoder 112.

In the low bit rate mono signal alternative, a mono encoder 114 operates upon the signal from summer 110. Notably, an inter-channel intensity difference processor 116 operates on normalized cross-correlations from block 206 for the left and right audio channels using:

$$g_{left} = \frac{2.0}{1 + \frac{CCF(G_L G_R)}{E_L G_L^2}}$$

$$3g_{right} = \frac{2.0}{1 + \frac{CCF(G_L G_R)}{E_R G_R^2}}$$

Where CCF is the cross-correlation of the left and right channels, $G_L$ and $G_R$ are the LPC gains calculated in the decimated domain for the left for the left and right channels respectively and $E_L$ and $E_R$ are the left and right channel energies. These formulas yield independent panning gains for the respective left and right audio channel.

More specifically, one exemplary embodiment of the present invention shows a low complexity method for calculating the panning gains of the left and right channels on a frame-by-frame basis using frequency components below 2 kHz, for example. This low complexity method builds upon the techniques used for calculating the ITDs, as disclosed in UK Patent Application GB 2453 117A, published Apr. 1, 2009 CML05704AUD (49561); and incorporated entirely by reference herein. In the aforementioned patent application, an encoding apparatus includes a frame processor that receives a multi-channel audio signal comprising at least a first audio signal from a first microphone and a second audio signal from a second microphone. An ITD processor determines an inter time difference between the first and second audio signals; and a set of delays generates a compensated multi channel audio signal from the multichannel audio signal by delaying at least one of the first and second audio signals in response to the inter time difference signal. A combiner generates a mono signal by combining channels of the compensated multi channel audio signal and a mono signal encoder encodes the mono signal. The inter time difference may specifically be determined by an algorithm based on determining cross correlations between the first and second audio signals. The panning gains herein ($g_{left}$ and $g_{right}$) are calculated from the peak cross-correlation in the decimated LPC residual domain of the left and right channels.

Since this cross-correlation enables calculation of the ITD parameter, the additional processing is very small. Additionally, since the mono downmix (M) is given by M=(L+R)/2, (L is left channel and R is right channel), it can be shown that when the panning gains are calculated as shown and applied to the mono downmix, the total energy of the stereo input signal is preserved.

The panning gains are low pass filtered in the logarithmic decibel (dB) domain, before being quantized in 1 dB steps (+7 dB to −8 dB). In the decoder the gains are applied to the mono down mix and smoothed using a trapezoidal window which is the same length as the frame.

Calculating the gains in this manner facilitates the encoding of the left and right stereo channels as a mono channel with additional gain and delay parameters. This allows stereo reproduction on a handset using only the mono signal plus a few additional bits to represent the gain of the left and right channels and ITD. The data is transmitted asynchronously using the method disclosed in US Patent Application US 2010 012545 A1, published May 20, 2010 CML07237AUD (55398); said method is incorporated entirely by reference herein. Specifically, as described in the abstract of the aforementioned patent; an apparatus encodes at least one parameter associated with a signal source for transmission over k frames to a decoder that includes a processor configured in operation to assign a predetermined bit pattern to n bits associated with the at least one parameter of a first frame of k frames. Additionally, the processor sets the n bits associated with the at least one parameter of each of k−1 subsequent frames to values, such that the values of the n bits of the k−1 subsequent frames represent the at least one parameter. The predetermined bit pattern indicates a start of the at least one parameter. This allows the stereo parameters to be transmitted in a robust manner, using only 200 bits per second (100 bits for the delay (ITD) and 100 bits for the left and right gains (IID). The left and right gains are each encoded and sent with just one bit per speech frame. Six speech frames of 20 ms are generally used for the transmission of one set of gains (one frame synch +5 frames of data); however, other combinations of frames per millisecond may be used as well.

The low-bit rate parametric stereo mode can be used in conjunction with full stereo. The ITD's are calculated and transmitted in the same way, and a gain parameter can be calculated from the full stereo panning gains, allowing the low bit rate stereo to be "boot-strapped" from the full stereo. In this way it is possible to switch back and forth between the stereo encodings, depending on either the source material or the available bandwidth.

The resulting gain from inter-channel intensity difference processor 116 is quantized in block 118.

Figure 2:
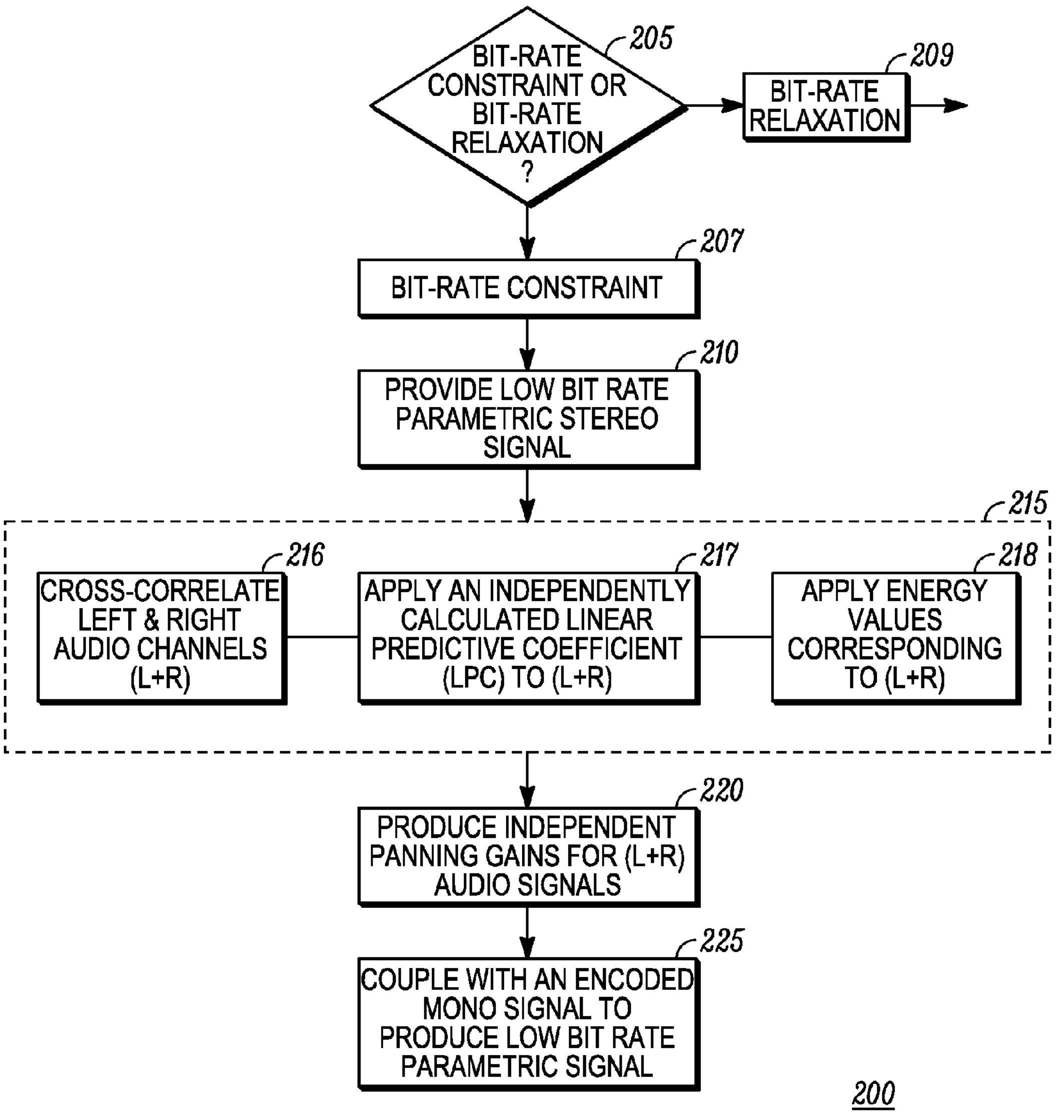
FIG. 2 is a flowchart of a method of estimating a parameter for low bit rate stereo transmission in accordance with some embodiments of the present invention.

In flowchart 200 of FIG. 2, a decision is made in block 205 as to whether the bit rate is constrained or relaxed. If the bit rate is determined to be constrained in block 207, then a low bit rate parametric stereo signal is provided by block 210 to block 215, which contains at least three operations in blocks 216, 217, and 218, respectively.

Block 216 cross-correlates left and right audio channels for the low bit rate parametric stereo signal. Subsequently, block 217 applies an independently calculated linear predictive coefficient (LPC) to the left and right audio channels. Whereupon block 218 applies energy values that correspond to the left and right audio channels.

Upon completion of the above operations, block 220 produces independent panning gains for the left and right audio channels prior to coupling the low bit rate signal to an encoded mono signal that transforms the left and right audio channel/signal to a low bit rate parametric signal.

Figure 3:
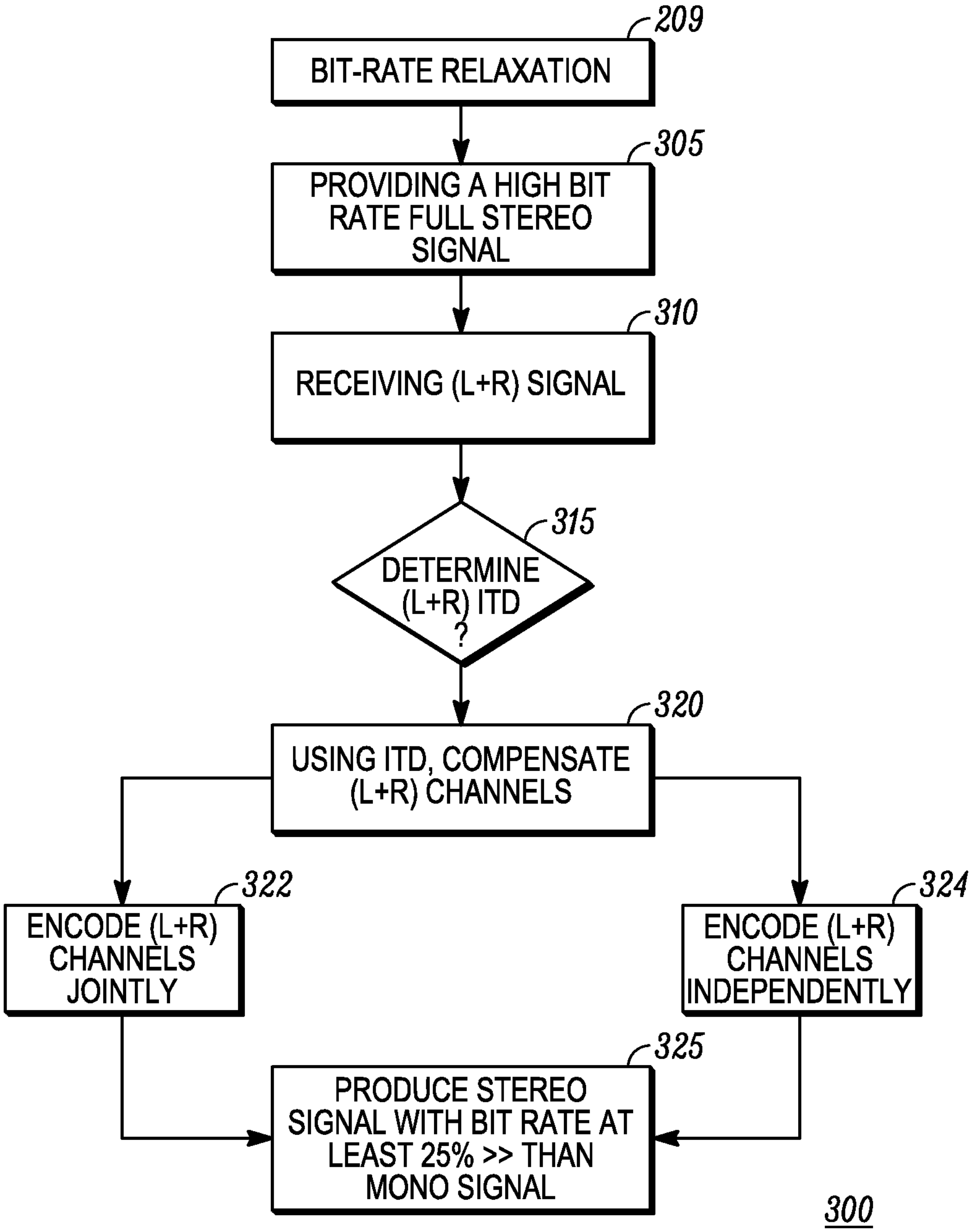
FIG. 3 is another flowchart for a method of switching stereo signals from a high bit rate full stereo signal to a low bit rate parametric signal in accordance with some embodiments of the present invention.

If in flowchart 200 of FIG. 2 the bit rate is determined to be relaxed in block 209, then the process found in FIG. 3 and shown as flowchart 300 is used. Block 305 provides a high bit rate full stereo signal. While block 310 receives the left and right signals prior to block 315 determining the ITD for the left and right signals.

Using the determined ITD values, the left and right audio channels are compensated in block 320. Thereafter, the left and right audio channels are encoded jointly in block 322 or alternatively the left and right audio channels are encoded independently in block 324.

Under either scenario, block 325 produces a stereo signal with bit rate at least 25% greater than a conventional mono signal.

Figure 4:
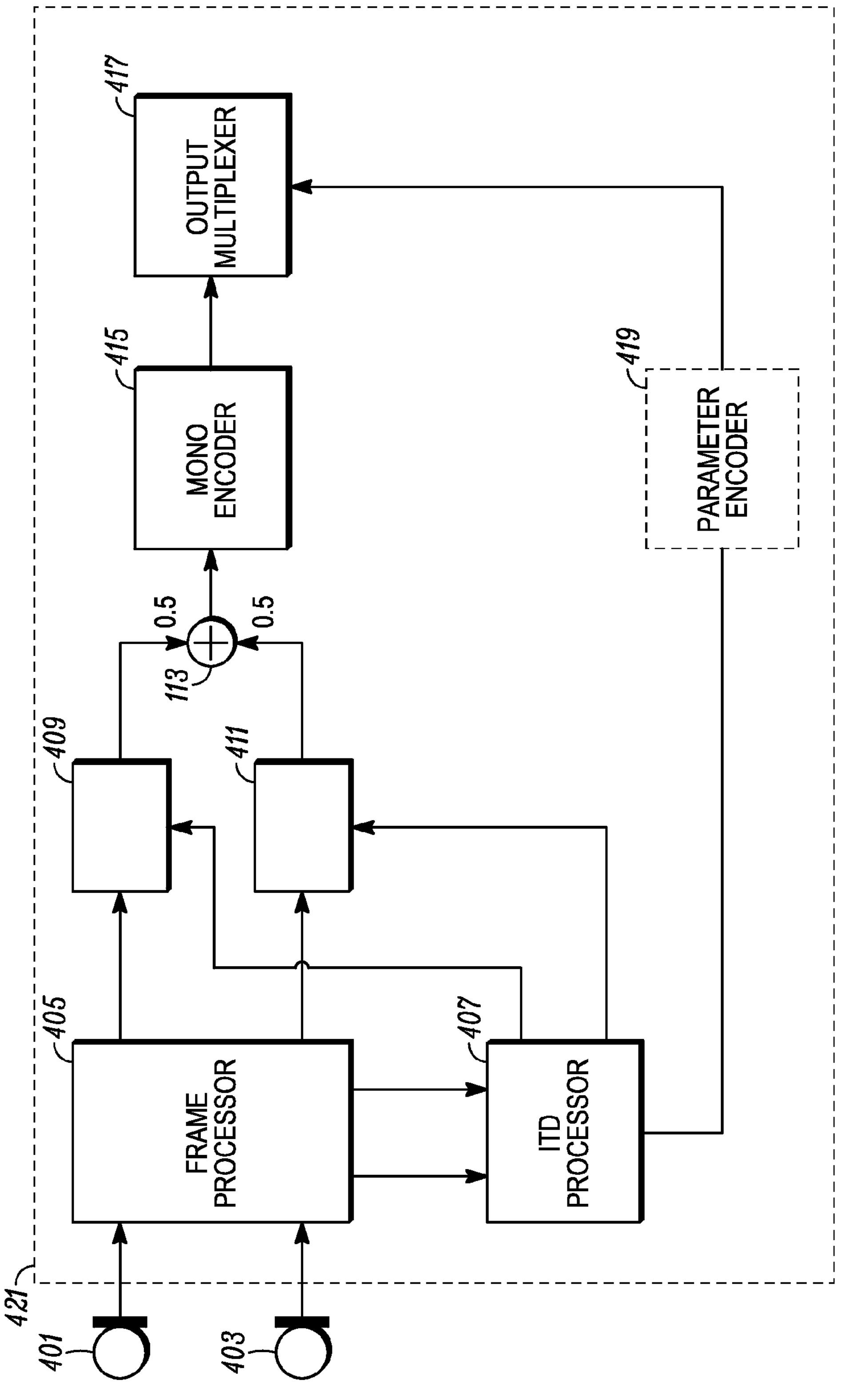
FIG. 4 is a block diagram of processing in accordance with some embodiments of the present invention.
Figure 5:
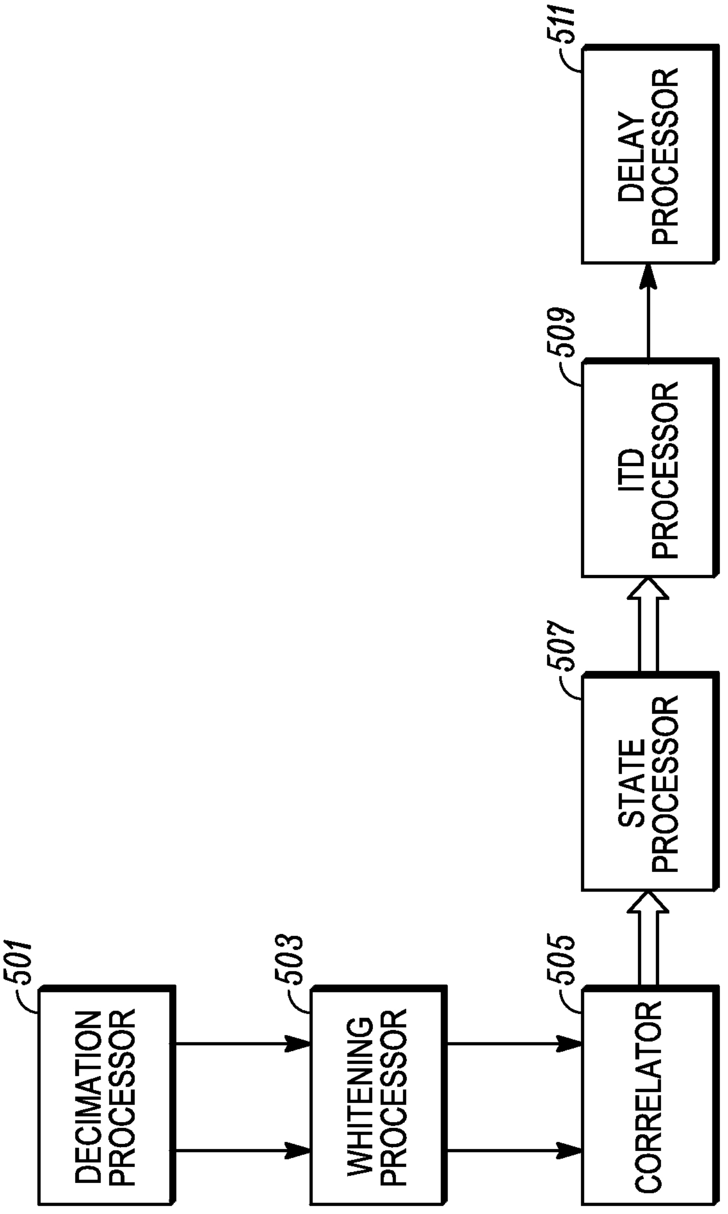
FIG. 5 is a block diagram of processing in accordance with some embodiments of the present invention.

Regarding FIG. 4, an encoding apparatus 421 is shown as including a frame processor 405 with audio signals from two microphones, microphone 401 and microphone 403, respectively. Frame processor 405 outputs to an ITD processor 407. ITD processor 407 is further illustrated in FIG. 5.

In one alternative embodiment illustrated by example in FIG. 4, microphones 401, 403 are coupled to a frame processor 405 which receives speech signals from the microphones 401, 403 on first and second channels. The frame processor 405 divides the received signals into sequential frames. In an example, the sample frequency is 16 ksamples/sec and the duration of a frame is 20 msec resulting in each frame comprising 320 samples. The frame processing does not result in an additional delay to the speech path.

The frame processor 405 is coupled to an ITD processor 407 which is arranged to determine an ITD parameter or stereo delay parameter between the speech signals from the different microphones 401, 403. The ITD parameter is an indication of the delay of the speech signal in one channel relative to the speech signal in the other. For example, when a speaker, who is closer to microphone 401 than compared to microphone 403, speaks the speech signal received at microphone 403 will be delayed compared to the speech signal received at microphone 401 due to the location of the speaker. In order for the delay to be accounted for when the speech signal is recreated at a receiving device, the delay parameter is encoded and transmitted to the receiving device. In the example, the ITD parameter may be positive or negative depending on which of the channels is delayed relative to the other. The delay will typically occur due to the difference in the delays between the dominant speech source (i.e. the speaker currently speaking) and the microphones 401, 403.

In the embodiment shown in FIG. 4, the ITD processor 407 is furthermore coupled to two delays 409, 411. The first delay 409 is arranged to introduce a delay to the first channel and the second delay 409 is arranged to introduce a delay to the second channel. The amount of the delay which is introduced depends on the ITD parameter determined by the ITD processor 407. Furthermore, in a specific example only one of the delays is used at any given time. Thus, depending on the sign of the estimated ITD parameter, the delay is either introduced to the first or the second signal. The amount of delay is specifically set to be as close to the ITD parameter as possible. As a consequence, the speech signals at the output of the delays 409, 411 are closely time aligned and will specifically have an inter time difference which typically will be close to zero.

The delays 409, 411 are coupled to a combiner 413 which generates a mono signal by combining the two output signals from the delays 409, 411. In the example, the combiner 413 is a simple summation unit which adds the two signals together. Furthermore, the signals are scaled by a factor of 0.5 in order to maintain the amplitude of the mono signal similar to the amplitude of the individual signals prior to the combination. In alternative arrangements, the delays 409, 411, can be omitted.

Thus, the output of the combiner 413 is a mono signal which is a down-mix of the two speech signals received at the microphones 401 and 403.

The combiner 413 is coupled to a mono encoder 415 which performs a mono encoding of the mono signal to generate encoded speech data. The mono encoder may be a Code Excited Linear Prediction (CELP) encoder in accordance with the EV-VBR Standard, or another suitable encoder perhaps, corresponding to an equivalent standard.

The mono encoder 415 is coupled to an output multiplexer 417 which is furthermore coupled to the ITD processor 407 via an optional apparatus. The optional apparatus such as a parameter encoder 419 may be arranged to encode at least one parameter associated with a signal source for transmission over k frames to a decoder, for example the decoding apparatus 422 of a receiving device. In the example described herein, parameter encoder 419 is arranged to encode the ITD parameter associated with the speech signals at microphones 401 and 403.

Parameter encoder 419 comprises a processor configured in operation to assign a predetermined bit pattern to n bits associated with the ITD parameter of a first frame of the k frames and set the n bits associated with the ITD parameter of each of k−1 subsequent frames to values, such that the values of the n bits of the k−1 subsequent frames represent the at least one parameter. The predetermined bit pattern indicates a start of the at least one parameter.

In an embodiment, k and n are integers greater than one and are selected so that n bits per frame are dedicated to the transmission of the ITD parameter with an update rate over every k frames which will be sufficient to exceed the Nyquist rate for the parameter once the scheme overheads have been taken into account. The transmission of the ITD parameter over k frames is initiated by sending the predetermined bit pattern with the first frame using the available n bits associated with the ITD parameter. Typically, the predetermined bit pattern is all zeros.

In an embodiment, the values of the n bits in each of the k−1 subsequent frames are selected to be different to the values of the n bits of the predetermined bit pattern. There are therefore $2^n-1$ possible values for the n bits which avoid the predetermined bit pattern. The values of the n bits in each of the k−1 subsequent frames are used to build up the ITD parameter, beginning with the least significant or most significant digit of the ITD parameter in base $2^n-1$. The number of possible values which the ITD parameter can have is $(2^n-1)^{(k-1)}$, given that k n bits have been transmitted. This leads to a transmission efficiency of 100/(k n). (k−1) log 2($2^n$−1) percent. For realistic implementations, efficiency exceeds 66% and can easily exceed 85%.

Notably, ITD processor 407 comprises a decimation processor 501 that receives the frames of samples for the two channels from the frame processor 405. The decimation processor 501 first performs a low pass filtering followed by a decimation. In one example, the low pass filter has a bandwidth of around 2 khz. A decimation factor of four is used for a 16 ksamples/sec signal resulting in a decimated sample frequency of 4 ksamples/sec. The effect of the filtering and decimation is partly to reduce the number of samples processed, thereby, reducing computational demand. However, in addition, the approach allows the inter time difference estimation to be focused on lower frequencies where the perceptual significance of the inter time difference is most significant. Thus, the filtering and decimation not only reduces the computational burden, but also provides the synergistic effect of ensuring that the inter time difference estimate is relevant to the most sensitive frequencies.

The decimation processor 501 is coupled to a whitening processor 503 that is arranged to apply a spectral whitening algorithm to the first and second audio signals prior to the correlation. The spectral whitening leads to the time domain signals of the two signals more closely resembling a set of impulses, in the case of voiced or tonal speech, thereby, allowing the subsequent correlation to result in more well defined cross correlation values and specifically to result in narrower correlation peaks (the frequency response of an impulse corresponds to a flat or white spectrum and conversely the time domain representation of a white spectrum is an impulse).

In one example, the spectral whitening comprises computing linear predictive coefficients for the first and second audio signal and to filter the first and second audio signal in response to the linear predictive coefficients.

Figure 6:
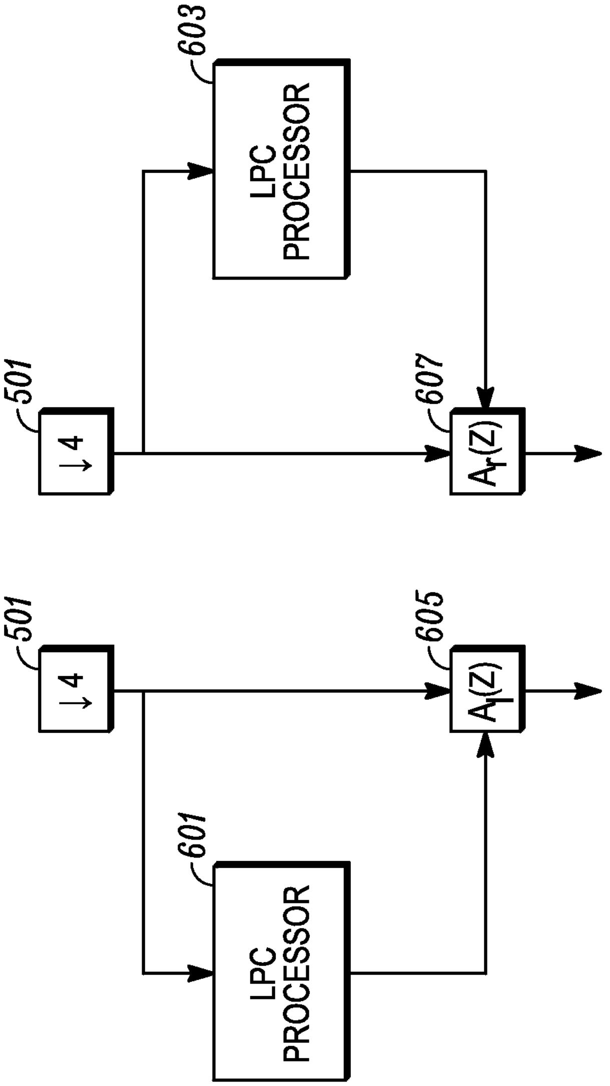
FIG. 6 is a block diagram of processing in accordance with some embodiments of the present invention.

Elements of the whitening processor 503 are shown in FIG. 6. Notably, the signals from decimation processor 501 are fed to LPC processors 601, 603, which determine Linear Predictive Coefficients (LPC) for linear predictive filters for the two signals. It is expected that skilled persons in the art will know different algorithms for determining LPCs and that other suitable algorithms may be used without detracting from the invention herein.

In an exemplary embodiment, two audio signals are fed to two filters 605, 607 that are coupled to the LPC processors 601, 603. The two filters are determined such that they are the inverse filters of the linear predictive filters determined by the LPC processors 601, 603. Specifically, the LPC processors 601, 603 determine the coefficients for the inverse filters of the linear predictive filters and the coefficients of the two filters are set to these values.

The output of the two inverse filters 605, 607 resemble sets of impulse trains in the case of voiced speech and thereby allow a significantly more accurate cross-correlation to be performed than would be possible in the speech domain.

Referring again to FIG. 5, the whitening processor 503 is coupled to a correlator 505 that is arranged to determine cross correlations between the output signals of the two filters shown in FIG. 6, filter 605 and filter 607, for a plurality of time offsets.

Specifically, correlator 505 can determine the values:

$$c^t = \sum_N x_n \cdot y_{n-t}$$

The correlation is performed for a set of possible time offsets. In the specific example, the correlation is performed for a total of 97 time offsets corresponding to a maximum time offset of ±12 msec. However, it will be appreciated that other sets of time offsets may be used in other embodiments. Thus, the correlator generates 97 cross-correlation values with each cross-correlation corresponding to a specific time offset between the two channels and thus to a possible inter time difference. The value of the cross-correlation corresponds to an indication of how closely the two signals match for the specific time offset. Thus, for a high cross correlation value, the signals match closely and there is accordingly a high probability that the time offset is an accurate inter time difference estimate. Conversely, for a low cross correlation value, the signals do not match closely and there is accordingly a low probability that the time offset is an accurate inter time difference estimate. Thus, for each frame the correlator 505 generates 97 cross correlation values with each value being an indication of the probability that the corresponding time offset is the correct inter time difference.

In one example, the correlator 505 is arranged to perform windowing on the first and second audio signals prior to the cross correlation. Specifically, each frame sample block of the two signals is windowed with a 20 ms window comprising a rectangular central section of 14 ms and two Hann portions of 3 ms at each end. This windowing may improve accuracy and reduce the impact of border effects at the edge of the correlation window.

Also, in the example, the cross correlation may be normalized. The normalization is specifically to ensure that the maximum cross-correlation value that can be achieved (i.e. when the two signals are identical) has unity value. The normalization provides for cross-correlation values which are relatively independent of the signal levels of the input signals and the correlation time offsets tested thereby providing a more accurate probability indication. In particular, it allows improved comparison and processing for a sequence of frames.

Implementation of the present invention enables switching between two different encoding modes or formats. Accordingly, one exemplary embodiment of the present invention encodes a stereo signal at either a high-bit rate or a low-bit rate with encoding selection that is dependent upon either a signal source or bandwidth constraint. The encoder of this embodiment includes a parametric processor operable upon both a left and right audio signal, wherein the parametric processor yields independent panning gains corresponding to the left and right audio signals.

Given an implementation of the present invention, a user should not experience any audible artifacts, such as clicking, during reduction of bit rate. This is especially advantageous in teleconferences where human speech dominates as the localized source of the audible signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way, but may also be configured in ways that are not listed.

It will be appreciated that some embodiments may be comprised of one or more generic or specialized processors (or “processing devices”) such as microprocessors, digital signal processors, floating point processors, customized processors and field programmable gate arrays (FPGAs) and unique stored program instructions, methods, or algorithms (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for estimating panning gain parameters for low bit rate stereo transmission, comprising the steps of:

a. deriving estimate of time delay between left and right audio channels in a multi-channel signal from a time delay subsystem, wherein the time delay system employs an inter-channel time difference (ITD) processor for;

i. receiving the left audio signal from a first microphone and receiving the right audio signal from a second microphone;

ii. downsampling the left and right audio signals to a lower bandwidth and sampling rate;

iii. producing a windowed and normalized cross correlated signal of the left and right audio signals;

b. employing cross-correlation between the left and right audio channels in the time delay subsystem;

c. employing a normalized cross-correlation within an inter-channel intensity difference (IID) processor; and d. deriving an estimate of panning gains for the left and right audio channels from the IID processor.

2. The method claimed in claim 1, further comprising the step of coupling an encoded mono stereo signal with bits that represent panning gains corresponding to the left and right audio channels such that a low-bit rate parametric stereo signal is produced.

3. A method for switching a stereo encoding technique from a high bit rate full stereo technique to a low bit rate parametric technique wherein the cause of the switching corresponds to either bit-rate constraint or bit-rate relaxation and wherein the method comprises the steps of:

a. determining whether bit-rate constraint or bit-rate relaxation is employed;

b. providing the low bit rate parametric stereo signal in a manner that comprises:

(1) operating independently upon the left and right audio signals to yield independent panning gains corresponding to left and right audio signals using a combination of a cross-correlation of left and right audio channels, a linear predictive coefficient (LPC) gain independently calculated in a decimated domain for the left and right audio signals, and energy values corresponding to the left and right audio signals; and (2) coupling with an encoded mono signal to produce the low bit rate parametric signal; and alternatively c. providing the high bit rate full stereo signal in a manner that comprises:

(1) receiving a left and right audio channel from a multi-channel signal (2) determining an inter-channel time difference between the left and right audio channels;

(3) compensating both left and right channels according to the inter-channel time difference; and (4) encoding the left and right audio channels either jointly or independently to produce a higher quality stereo signal representation comprising a stereo signal that has increase in bit rate by at least 25% when compared to an equivalent mono signal.

4. An apparatus with functionality to encode a stereo signal at either a high-bit rate or a low-bit rate with encoding selection that is dependent upon either a signal source or bandwidth constraint, the encoder comprising:

a parametric processor operable upon both a left and right audio signal, wherein the parametric processor yields independent panning gains corresponding to the left and right audio signals wherein a panning gain corresponding to the left audio signal ($g_{left}$) is found using:

$$g_{left} = \frac{2.0}{1 + \frac{CCF(G_L G_R)}{E_L G_L^2}}$$

where CCF is a cross-correlation of left and right audio channels, $G_L$ is a linear predictive coefficient (LPC) gain calculated in a decimated domain for the left audio signal, and $E_L$ is value of left audio signal energy; and wherein a panning gain corresponding to the right audio signal ($g_{right}$) is found using:

$$g_{right} = \frac{2.0}{1 + \frac{CCF(G_L G_R)}{E_R G_R^2}}$$

where CCF is a cross-correlation of left and right audio channels, linear predictive coefficient (LPC) gain calculated in a decimated domain for the right audio signal, and $E_R$ is value of right audio signal energy.

5. The apparatus claimed in claim 4, wherein the panning gains are calculated using frequency components below 2 kHz.

6. The apparatus claimed in claim 4, wherein the panning gains are calculated from a peak cross-correlation in a decimated linear predictive coefficient (LPC) residual domain of the first and second audio signals.

7. The apparatus claimed in claim 4, wherein the panning gains are encoded and transmitted with a single bit per a speech frame.

8. The apparatus claimed in claim 4, wherein the first and second audio signals are stereo speech or voice signals.

9. The apparatus claimed in claim 8, wherein the stereo speech or voice signals are transmitted at 100-400 bits per second (bps) along with transmission of mono speech signals.

10. An apparatus that encodes a stereo signal at a high-bit rate and a low-bit rate with selection that is dependent upon either a signal source or bandwidth constraint, the apparatus comprising:

a. a microphone system providing a first audio signal and a second audio signal wherein the second audio signal has a time difference from the first audio signal;

an analyzer coupled to the microphone system that determines an inter-channel time difference between the first audio signal and the second audio signal, by employing an inter-channel time difference (ITD) processor for;

i. receiving the left audio signal from a first microphone and receiving the right audio signal from a second microphone;

ii. downsampling the left and right audio signals to a lower bandwidth and sampling rate;

iii. producing a windowed and normalized cross correlated signal of the left and right audio signals and;

b. a parametric processor coupled to the analyzer that calculates panning gains of the first and second audio signals on a frame-by-frame basis; and c. an encoder coupled to the processor so that an encoded mono signal is coupled with the panning gains of the first and second audio signals and the inter-time difference signal corresponding to the first and second audio signals.

11. A computer-readable storage medium having computer readable code stored thereon for programming a computer to perform a method of estimating panning gain parameters for low bit rate stereo transmission, comprising the steps of:

a. deriving estimate of time delay between left and right audio channels in a multi-channel signal from a time delay subsystem, wherein the time delay system employs an inter-channel time difference (ITD) processor for;

i. receiving the left audio signal from a first microphone and receiving the right audio signal from a second microphone;

ii. downsampling the left and right audio signals to a lower bandwidth and sampling rate;

iii. producing a windowed and normalized cross correlated signal of the left and right audio signals;

b. employing cross-correlation between the left and right audio channels in the time delay subsystem;

c. employing a normalized cross-correlation within an inter-channel intensity difference (IID) processor; and d. deriving an estimate of panning gains for the left and right audio channels from the IID processor.

* * * * *